United States Patent [19]

Schmitt et al.

[11] Patent Number: 4,770,204

[45] Date of Patent: Sep. 13, 1988

[54] SPRING-LOADED SAFETY VALVE FOR GASES AND VAPOR

[76] Inventors: Manfred Schmitt, Johann-Casimier-Strasse 17, 6701 Friedelsheim; Emil Zitzelsberger, Ulmenweg 6, 6148 Heppenheim/Kirschhausen, both of Fed. Rep. of Germany

[21] Appl. No.: 93,564

[22] PCT Filed: Nov. 21, 1986

[86] PCT No.: PCT/DE86/00474

§ 371 Date: Jul. 21, 1987

§ 102(e) Date: Jul. 21, 1987

[87] PCT Pub. No.: WO87/03352

PCT Pub. Date: Jun. 4, 1987

[30] Foreign Application Priority Data

Nov. 23, 1985 [DE] Fed. Rep. of Germany ....... 3541495

[51] Int. Cl.$^4$ .............................................. F16K 17/20
[52] U.S. Cl. ................................... 137/469; 137/476
[58] Field of Search .............. 137/469, 475, 476, 477, 137/478

[56] References Cited

U.S. PATENT DOCUMENTS

| 2,431,769 | 12/1947 | Parker | 137/469 |
| 2,517,858 | 8/1950 | Farris | 137/478 X |
| 4,418,714 | 12/1983 | Cullie | 137/478 |

Primary Examiner—Harold W. Weakley
Attorney, Agent, or Firm—Michael J. Striker

[57] ABSTRACT

In a spring-loaded safety valve for gas and vapor, a valve disk which faces a valve seat and is movable to open or close the valve is provided with a deflecting collar which includes at an inner face thereof overlapping the valve seat two cone portions smoothly connected to each other by radii.

6 Claims, 3 Drawing Sheets

SPRING-LOADED SAFETY VALVE FOR GASES AND VAPOR

BACKGROUND OF THE INVENTION

The invention relates to a spring-loaded safety valve for gases and vapor. The valve of the foregoing type includes a valve disk, which is arranged on the valve seat, supports a deflecting collar which acts as a means for assisting lift, outwardly overlaps the cross section of the valve seat and is shaped in the manner of an inner cone.

The purpose of such means for assisting lift is, on the one hand, to increase the forces acting in the valve opening direction by means of the deflection at the disk edge so as to overcome the valve spring force which increases with the opening lift. On the other hand, the increase in force per lift unit should be as constant as possible, that is, the safety valve should have a force-lift characteristic line which is as straight as possible so that the opening pressure differential and the closing pressure differential are as small as possible.

A spring-loaded safety valve is known from DE-GM No. 1 965 020, in which the deflecting collar provided at the enlarged valve disk edge is constructed as a continuous inner cone. When this safety valve is opened the lower part of the deflecting cone is still located far below the valve seat, so that the outflowing medium at the conical flow conducting surface of the deflecting collar is deflected downward relatively powerfully opposite the inflowing direction. As the lift increases, the deflecting cone, together with the valve disk, continues to move in the valve opening direction, causing the action of the diagonally extending flow conducting surface of the deflecting collar on the outflowing medium to become weaker. Thereby the increase of force per lift unit decreases, and the force-lift characteristic line flattens. Moreover, it was recognized that, with this conical flow conducting surface at the deflecting collar, the force-lift characteristic line has a break approximately in the first third of the lift, which break acts in the direction of the force reduction. Because of this flattening and this break of the force-lift characteristic line, there is a large working pressure differential which is equal to the sum of the opening and closing pressure differentials.

Moreover, it is known from U.S. Pat. No. 2,597,057 to guide the valve disk in a stationary deflecting cylinder and to arrange a threaded adjusting ring at the valve seat. Because of the stationary lower edge of the deflecting cylinder, the degree of deflection of the outflowing medium is maintained approximately until the full valve opening position; however, this valve disk sliding guide in the deflecting cylinder is relatively costly and involves the particular risk that dirt particles will be jammed in the guide gap, thereby jeopardizing the safety function. The height of the valve outflow edge can be varied by means of the adjusting ring at the valve seat and the outflow can accordingly be adapted to the operating conditions, but an improvement of the opening pressure differential always involves a worsening of the closing pressure differential, and vice versa. Moreover, the adjusting ring can be adjusted and stopped only when the system to be secured is taken out of operation.

SUMMARY OF THE INVENTION

The invention is based on the problem of constructing the means for assisting the lift for spring-loaded safety valves in such a way that low opening and closing pressure differentials are achieved through simple means and not at the cost of a reduction of the flow coefficient.

The solution to this problem is seen in the characteristic features of the patent claims. According to the present invention the deflecting collar consists of an inner cone portion and an outer cone portion which projects in the direction of flow opposite the inner cone section; the free flow cross section, which results from the respective lift position and, accordingly, from the respective smallest distance of the flow conducting surface of the deflecting collar from the outer edge of the valve seat, does not increase progressively as with a continuously conical flow conducting surface, but, rather, undergoes a reduction of the flow cross section increase in the area of the point of transition between the inner and outer cone portions. Because of this reduced surface increase, the pressure distribution along the flow conducting surface, whose integral of vertical components gives the additional valve opening force, is influenced in such a way that the force break in the force-lift characteristic line is avoided and an approximately constant increase of force per lift unit is achieved. The flattening of the force-lift characteristic line during an extensive lift is simultaneously counteracted by means of the projecting outer cone portion so that the work pressure differential can be kept small.

In order that the flow coefficient not be influenced in a disadvantageous manner by means of the cross-sectional reduction at the projection of the lift collar, the two cone portions are connected with one another at the point of transition by means of a middle portion which ensures a smooth transition and is arranged in the area of the surface area of the cone in which a force break is drawn in the force-lift characteristic line in a continuously conical configuration.

The middle portion may be constructed as a narrower intermediate cone portion which extends at an acute angle relative to the valve intake axis so that flow separation is prevented in the area of the projection. In order to achieve an even softer flow deflection at the point of transition, the middle portion is connected via radii with the inner cone portion on the one hand and with the outer cone portion on the other hand.

The middle portion, which forms the projection, may be arranged at the deflecting collar at a height such that the reduction of the flow cross-sectional increase is effective at approximately a third of the maximum valve lift. Accordingly, the middle portion lies at the determined break point of the force-lift characteristic line of a continuously conical deflecting collar.

It was recognized that a smaller break in the force-lift characteristic line also occurs in the direction of the force reduction at the start of the valve opening lift, which decelerates the valve opening process in the first opening phase. In order to compensate for this characteristic line break, as well, it is suggested, to construct the outer diameter of the valve seat so as to be greater than the outer diameter of the sealing surface of the valve disk and to connect the deflecting collar to the valve disk above the sealing surface by means of a recess so that the flow conducting surface of the deflecting collar forms a narrow place with the outer edge of the valve seat at the beginning of the valve opening lift. An additional opening force for compensating the force break is achieved in the initial phase of the opening movement as a result of the throttling action by means of the narrow place formed in this way between the flow conducting surface of the deflecting collar and the outer edge of the valve seat. As the lift increases, this gap becomes so great that the throttling action ceases.

The novel features which are considered as characteristic for the invention are set forth in particular in the appended claims. The invention itself, however, both as to its construction and its method of operation, together with additional objects and advantages thereof, will be best understood from the following description of specific emodiments when read in connection with the accompanying drawings.

DETAILED DESCRIPTION OF THE PREFERRED EMBODIMENTS

Figure 1:
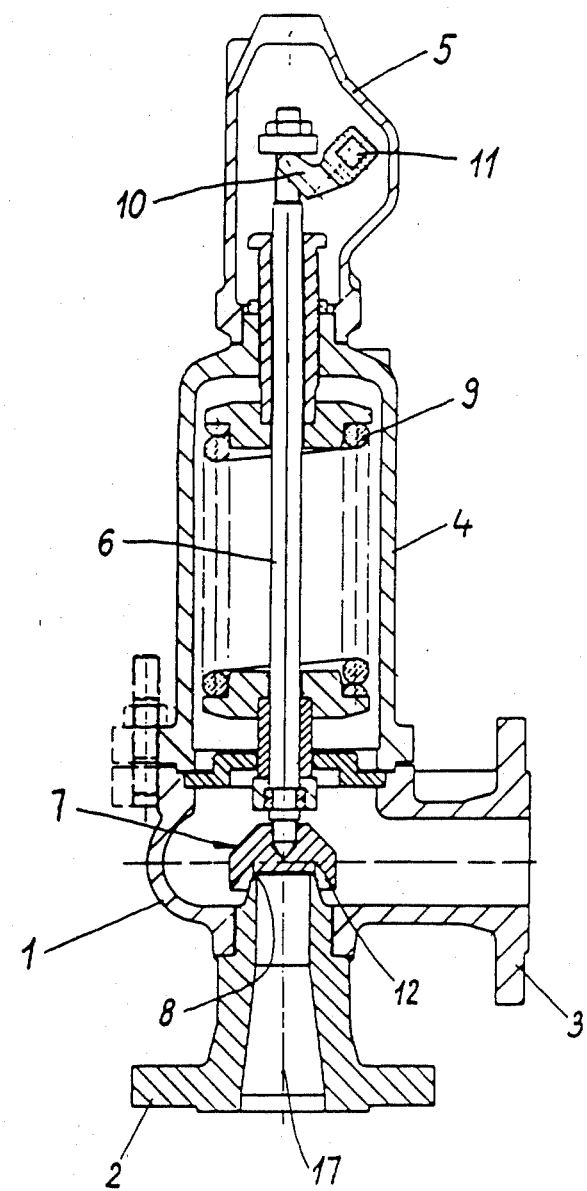
FIG. 1 shows an axial sectional view of a spring-loaded safety valve with the deflecting collar, according to the invention.

The safety valve shown in FIG. 1 is formed substantially of the valve housing 1 with intake connection piece 2 and discharge connection piece 3, spring hood 4 with lifting cap 5, and valve spindle 6 with valve disk 7 and valve seat 8. The valve disk 7 is continuously pressed in the valve closing direction by means of valve spring 9 by way of the valve spindle 6. The valve can be mechanically lifted from the outside by means of lifting tappet 10 and the lifting shaft 11. In order to increase the opening force the valve disk 7 carries a deflecting collar 12 which is shaped in the manner of an inner cone and overlaps the periphery of the valve seat 8 in an outward direction.

Figure 2:
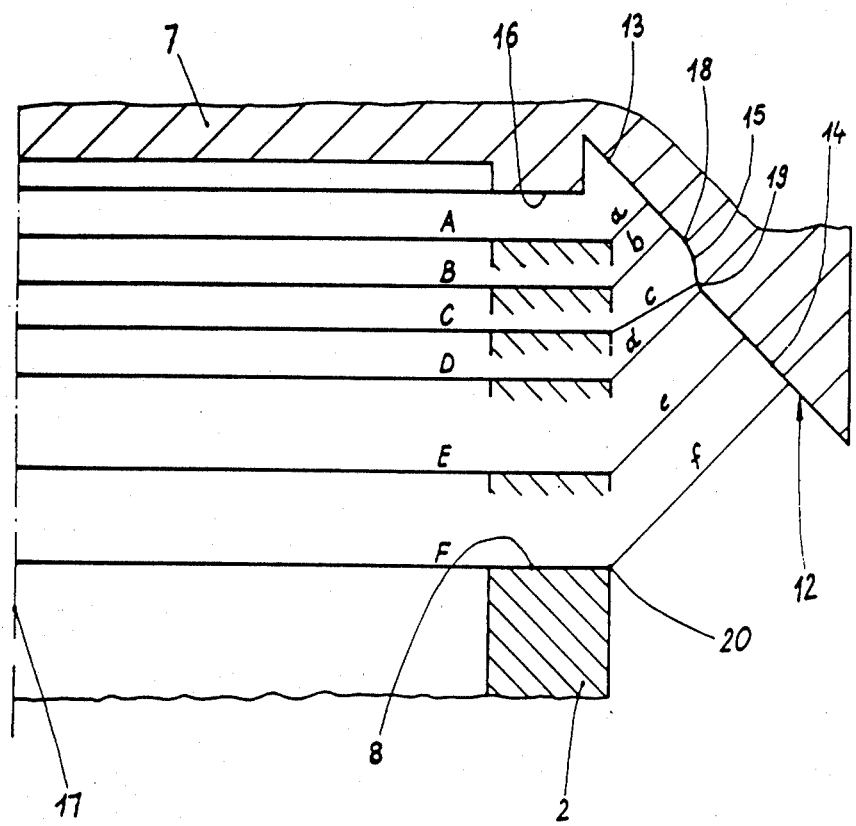
FIG. 2 shows the valve seat with valve disk and deflecting collar in enlarged scale, in different lift positions.

The deflecting collar 12 of the valve disk 7 is formed, as shown in FIG. 2, of an inner cone portion 13 and an outer cone portion 14. The two cone portions 13 and 14 have the same angle of taper, but the outer cone portion 14 projects in the direction of flow opposite to the inner cone portion 13. The two cone portions 13 and 14 are connected with one another at the point of transition by means of an intermediate portion 15 in such a way that there is a smooth transition between the two cone portions 13 and 14. When the safety valve is closed, the sealing surface 16 of the valve disk 7 rests on the valve seat 8 which is formed by the inner front face of the intake connection piece 2. The intermediate portion 15 is constructed as a narrower portion which encloses an angle with the valve intake axis 17, which angle is smaller than the angle of the two cone portions 13 and 14, but greater than zero. The intermediate cone portion 15 is smoothly connected with the inner cone portion 13, on the one hand, and with the outer cone portion 14, on the other hand, by means of radii 18 and 19.

In order to illustrate the action of the deflecting collar, according to the invention, different lift positions A to F of the valve disk 7 are shown in FIG. 2, wherein the valve seat 8 is displaced, rather than the valve disk 7, for the sake of simplicity. In the various lift positions A to F, the vapor flows radially in an outward direction between the seat surfaces 8 and 16 and is deflected downward by means of the deflecting collar 12. The downward flow is effected in the different lift positions A to F via the free annular flow cross sections a to f, which result from the shortest respective distance of the flow conducting surface of the deflecting collar 12 from the outer edge 20 of the valve seat 8. The increase rate of the free outflow surface b to d, which free outflow surface b to d increases progressively per se, is reduced in the area of the intermediate portion 15 located between the inner and outer cone portions by means of the outer cone portion 14, which projects in the direction of flow opposite to the inner cone portion 13. The pressure distribution along the flow conducting surface is influenced by means of this reduced surface increase in such a way that the force break occurring in the force-lift characteristic line with a continuously conical deflecting collar is avoided.

Figure 3:
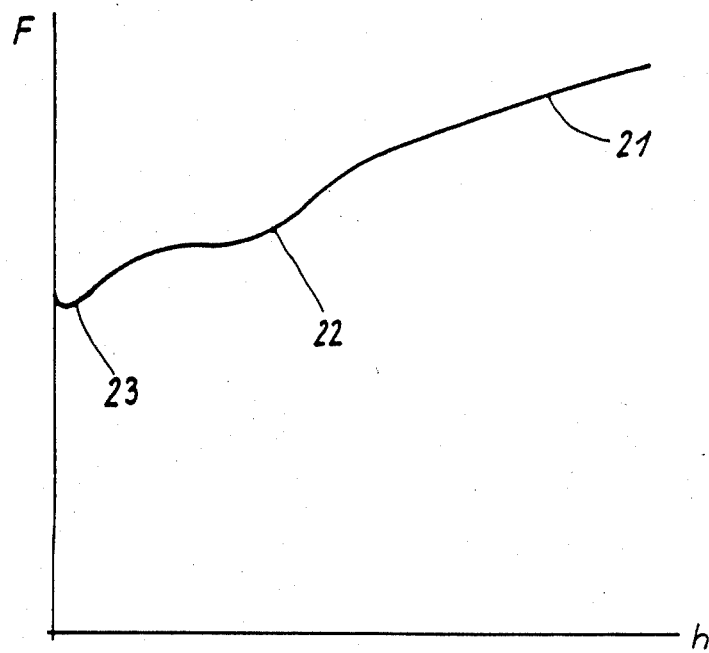
FIG. 3 shows the typical force-lift characteristic line of a spring-loaded safety valve with continuously conically extending deflecting collar.

FIG. 3 shows the typical curve of the force-lift characteristic line 21 in a deflecting collar which is constructed so as to be continuously conical. The curve 21 clearly shows that the force F undergoes a break 22 where the lift h amounts to approximately a third of the maximum lift. This characteristic line bulge 22 is prevented by means of reducing the cross-sectional increase by means of the deflecting collar which projects in the direction of the flow, and a force increase per lift unit is achieved which is approximately constant over the entire lift.

Figure 4:
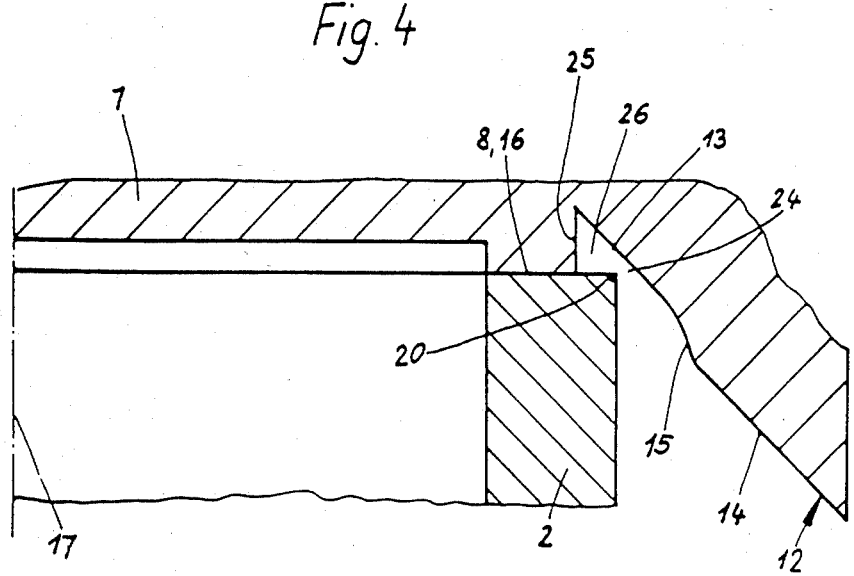
FIG. 4 shows the valve seat with valve disk, according to FIG. 2, in the valve closing position.

The curve shown in FIG. 3 also shows that a small force break 23 likewise occurs in the beginning of the opening lift. In order to avoid this force break 23 the valve seat 8 and the inner cone portion 13 of the deflecting collar 12 are constructed in such a way that there is a narrow place 24 at the beginning of the opening lift, as shown in FIG. 4. The outer diameter of the valve seat 8 is constructed for this purpose so as to be greater than the outer diameter of the sealing surface 16 of the valve disk 7, and the deflecting collar 12 is connected to the valve disk 7 above the sealing surface 16 by means of a recess 25. At the beginning of the valve opening process an excess pressure occurs in the chamber 26 by means of the throttling at the bottleneck 24, which excess pressure causes an additional opening force and accordingly counteracts the curve break 23. As the lift continues to increase, the effect of the narrow place 24 decreases so that the force-lift characteristic line also extends linearly in the initial lift area.

It will be understood that each of the elements described above, or two or more together, may also find a useful application in other types of spring loaded safety valves differing from the types described above.

While the invention has been illustrated and described as embodied in a spring loaded safety valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a spring-loaded safety valve for gases and vapor comprising a valve seat, a valve disk arranged on the valve seat and supporting a deflecting collar which acts for assisting a valve lift, said collar overlapping a periphery of the valve seat and being shaped so that an inner surface thereof is conical, the improvement comprising the deflecting collar (12) including an inner cone portion (13) and an outer cone portion (14), which are approximately identical with respect to an angle of taper, said outer cone portion projecting in the direction of flow opposite to that of the inner cone portion (13), and the inner and outer cone portions (13, 14) being connected with one another at a point of transition by an intermediate portion (15) which ensures a smooth transition and which is arranged in the area of said inner surface of said collar, in which a force break is indicated in a force-lift characteristic line produced by the deflecting collar which has a continuously conical configuration.

2. A safety valve according to claim 1, further including an intake connection member which forms said valve seat, said intake connection member having an axis, wherein said intermediate portion is formed by a narrow cone portion (15) which encloses with the axis (17) of said connection member an angle which is smaller than an angle of the inner and outer cone portions (13, 14) to said axis but greater than zero.

3. A safety valve according to claim 1, wherein the intermediate portion (15) is smoothly connected with the inner cone portion (13) and with the outer cone portion (14) by radii (18, 19).

4. A safety valve according to claim 1, wherein the intermediate portion (15), forms a projection which is arranged at the deflecting collar (12) at a height such that the reduction of a flow cross-sectional increase is effective at approximately a third of a maximal valve lift.

5. A safety valve according to claim 1, said valve disk having a sealing surface (16) facing said valve seat (8), wherein an outer diameter of the valve seat (8) is greater than the outer diameter of the sealing surface (16) of the valve disk (7), and wherein a recess (25) is formed at a connection of said valve disk with the deflecting collar (12) above the sealing surface (16) so that the inner cone portion (13) forms with an outer edge (20) of the valve seat (8) at the beginning of the opening lift a narrow throttling place (24).

6. A safety valve according to claim 2, wherein the intermediate portion (15) is smoothly connected with the inner cone portion (13) and with the outer cone portion (14) by radii (18, 19).

* * * * *